US012641336B2

(12) United States Patent
Nakamura

(10) Patent No.: US 12,641,336 B2
(45) Date of Patent: May 26, 2026

(54) IMAGE CAPTURING APPARATUS CAPABLE OF REDUCING INFLUENCE OF FLICKER, METHOD OF CONTROLLING SAME, AND STORAGE MEDIUM

(71) Applicant: CANON KABUSHIKI KAISHA, Tokyo (JP)

(72) Inventor: Hinako Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 18/895,749

(22) Filed: Sep. 25, 2024

(65) Prior Publication Data

US 2025/0113101 A1     Apr. 3, 2025

(30) Foreign Application Priority Data

Oct. 3, 2023     (JP) ................................. 2023-172215

(51) Int. Cl.
H04N 23/745 (2023.01)
H04N 23/60 (2023.01)
H04N 23/73 (2023.01)

(52) U.S. Cl.
CPC ......... H04N 23/665 (2023.01); H04N 23/745 (2023.01)

(58) Field of Classification Search
CPC ..... H04N 23/665; H04N 23/745; H04N 23/73
See application file for complete search history.

(56) References Cited

U.S. PATENT DOCUMENTS

| | | | | |
|---|---|---|---|---|
| 11,039,082 B2 * | 6/2021 | Nakamura | ............. | H04N 23/73 |
| 11,284,015 B2 * | 3/2022 | Sugawara | .............. | H04N 23/70 |
| 2012/0002074 A1 * | 1/2012 | Baba | .................... | H04N 23/745 |
| | | | | 348/228.1 |
| 2017/0142315 A1 * | 5/2017 | Tsukagoshi | .......... | H04N 23/745 |
| 2020/0007737 A1 * | 1/2020 | Sugawara | .............. | H04N 23/72 |
| 2025/0039557 A1 * | 1/2025 | Ebata | .................... | H04N 23/745 |

FOREIGN PATENT DOCUMENTS

| | | | | |
|---|---|---|---|---|
| JP | 2014042352 A | 3/2014 | | |
| JP | 2016152537 A | * 8/2016 | ............. | G03B 7/091 |

* cited by examiner

*Primary Examiner* — Marly S Camargo
(74) *Attorney, Agent, or Firm* — Cowan, Liebowitz & Latman, P.C.

(57)     ABSTRACT

An image capturing apparatus that has an image sensor for capturing an object image formed through an optical system. A flicker detection section detects a frequency and a phase of flicker. A curtain speed as a time over which a shutter runs from the top to the bottom of the image sensor and a flicker period time as a time of one period of flicker are compared. In a case where the curtain speed is longer than the flicker period time, an image of an object is captured by controlling an image capturing accumulation time period, whereas in a case where the curtain speed is shorter than or equal to the flicker period time, an image of the object is captured by controlling image capturing timing based on the detected frequency and phase of the flicker.

12 Claims, 12 Drawing Sheets

LIGHT EMISSION IMAGE FOR LIGHT CONTROL

SHUTTER FULLY-OPENED SECTION

ACCUMULATION TIME PERIOD

STROBE EMISSION

TIME

LIGHT EMISSION IMAGE FOR LIGHT CONTROL

SHUTTER FULLY-OPENED SECTION

ACCUMULATION TIME PERIOD

STROBE EMISSION

TIME

FIG. 7B

IMAGE CAPTURING APPARATUS CAPABLE OF REDUCING INFLUENCE OF FLICKER, METHOD OF CONTROLLING SAME, AND STORAGE MEDIUM

BACKGROUND

Field

One disclosed aspect of the embodiments relates to an image capturing apparatus that is capable of reducing the influence of flicker, a method of controlling the same, and a storage medium.

Description of the Related Art

When a still image or moving image is captured under a flickering light source, the influence of flicker sometimes appears on an image as luminance unevenness and stripes. As a method of reducing the influence of flicker, a variety of methods are well-known. For example, Japanese Laid-Open Patent Publication (Kokai) No. 2014-42352 discloses a technique of reducing luminance unevenness and stripes by performing image capturing according to an accumulation time period of (n/(detected frequency (Hz)) (seconds) with respect to a detected flicker period. Further, Japanese Laid-Open Patent Publication (Kokai) No. 2016-152537 discloses a technique of performing image capturing at a timing at which an image is difficult to be affected by flicker, based on the period and phase of detected flicker.

Summary of the Disclosure

According to the disclosure, in a first aspect, there is provided an image capturing apparatus image capturing apparatus including an image sensor for capturing an object image formed through an optical system, including at least one processor, and a memory coupled to the at least one processor storing instructions that, when executed by the processor, cause the processor to function as: a flicker detection section configured to detect a frequency and a phase of flicker, a comparison section configured to compare a curtain speed as a time period over which a shutter runs from a top to a bottom of the image sensor and a flicker period time as a time of one period of flicker, and an image capturing controller configured to capture, in a case where the curtain speed is longer than the flicker period time, an image of an object by performing control of an image capturing accumulation time period, whereas capture, in a case where the curtain speed is shorter than or equal to the flicker period time, an image of the object by performing control of image capturing timing based on the detected frequency and phase of the flicker.

In a second aspect, there is provided an image capturing apparatus that sequentially acquires, according to a strobe image capturing instruction, a non-light emission image for light control and a light emission image for light control, before main image capturing, identifies an object area based on luminance differences between the acquired images, and calculates an amount of main light emission, to thereby enable main image capturing of an object, including at least one processor, and a memory coupled to the at least one processor storing instructions that, when executed by the processor, cause the processor to function as: a flicker detection section configured to detect a frequency and a phase of flicker, and an image capturing controller configured to enable, in a case where a time period satisfying a predetermined condition exists, main image capturing, by performing control of a light control accumulation time period for setting the time period to an accumulation time period for light control, whereas, in the other cases, enable main image capturing, by performing control of light control timing, based on a frequency and a phase of the flicker.

Further features of the disclosure will become apparent from the following description of exemplary embodiments (with reference to the attached drawings).

BRIEF DESCRIPTION OF THE DRAWINGS

FIG. 7B is a diagram useful in explaining a light control problem under a flickering light source and a flicker reduction method.

DESCRIPTION OF THE EMBODIMENTS

Figure 1:
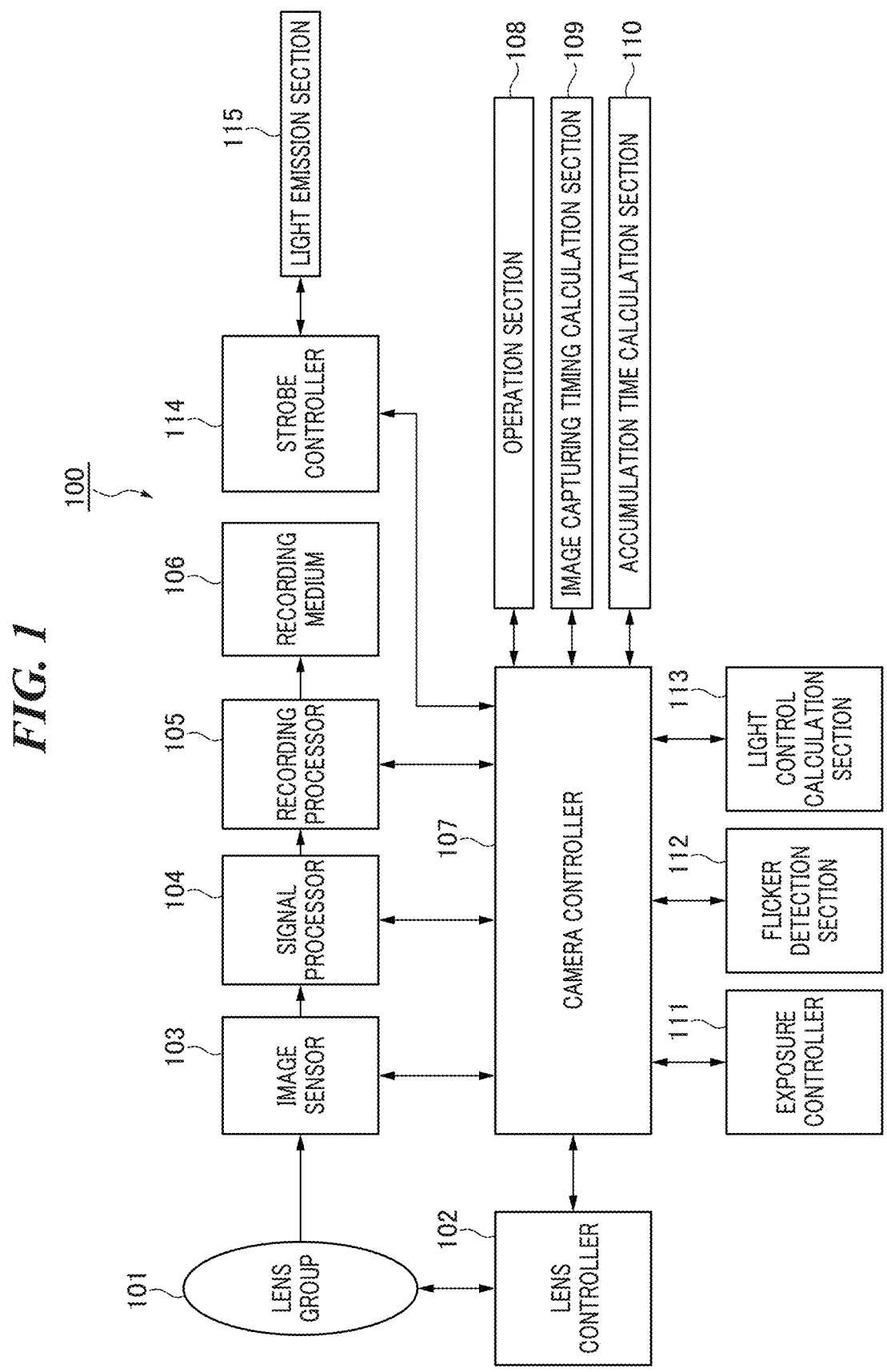
FIG. 1 is a block diagram showing an example of a configuration of an image capturing apparatus according to embodiments.

Hereinafter, embodiments will be described in detail with reference to the attached drawings. Note, the following embodiments are not intended to limit the scope of the claimed disclosure, and limitation is not made to a disclosure that requires a combination of all features described in the embodiments. Two or more of the multiple features described in the embodiments may be combined as appropriate. Furthermore, the same reference numerals are given to the same or similar configurations, and redundant description thereof is omitted. First, a first embodiment will be described.

FIG. 1 is a block diagram showing an example of a configuration of an image capturing apparatus 100. The image capturing apparatus 100 includes a lens group 101, an image sensor 103, a signal processor 104, a recording processor 105, a lens controller 102, and a camera controller 107. To the camera controller 107, the lens controller 102, the image sensor 103, the signal processor 104, the recording processor 105, an exposure controller 111, a flicker detection section 112, a light control calculation section 113, an operation section 108, an image capturing timing calculation section 109, an accumulation time calculation section 110, and a strobe controller 114 are connected. The camera controller 107 is configured to be capable of controlling these connected components and receiving notifications, including a detection result and a calculation result, obtained by the components. Further, the strobe controller 114 controls blinking of a light emission section 115. Note that a recording medium 106 appearing in FIG. 1 is a storage device for recording data of an image output from the signal processor 104 and can be attached and removed to and from the image capturing apparatus 100.

The lens group 101 has a plurality of lenses, and includes a mechanism for controlling exposure by using a diaphragm and a mechanism for performing e.g. a focus operation and a zoom operation. The lens group 101 causes incident light to form an optical image of an object on the image sensor 103. The image sensor 103 is configured to convert light of the formed optical image to electrical signals and performs conversion of each image having a plurality of pixels arranged in a matrix to electrical signals. The electrical signals converted by the image sensor 103 are output to the signal processor 104. The lens controller 102 performs control of driving of the diaphragm included in the lens group 101 and so forth, and the camera controller 107 performs control of an accumulation time period on the image sensor 103, control of an amplification factor of the electrical signals, and so forth. With this, for example, exposure of a captured image is controlled.

The signal processor 104 performs luminance correction, such as gain correction, color correction, such as white balance correction, other signal processing, and so forth, on the obtained electrical signals (image signals) and outputs resulting image data to the recording processor 105.

The recording processor 105 records image signals of a recordable format in the recording medium 106, such as a smart card. The camera controller 107 functions as a controller that controls the flow of the series of image processing operations. The camera controller 107 also has a function of receiving an operation from a user via the operation section 108 and calculating e.g. image capturing settings related to zooming, focusing, and the brightness of a captured image according to a set image capturing mode and the brightness of an object. The camera controller 107 notifies the lens controller 102, the exposure controller 111, and so forth of the calculated image capturing settings, and according to the notified image capturing settings, the lens controller 102 and the exposure controller 111 each control members and the like related to the corresponding control position and control state. Further, the camera controller 107 performs a variety of controls necessary for the image capturing apparatus 100, and is configured, for example, such that a central processing unit (CPU) loads programs stored in a recording medium, such as a read only memory (ROM), into a random access memory (RAM) and executes the loaded programs, whereby the processing operations, such as necessary control and necessary calculation, can be executed. These processing operations, such as necessary control and necessary calculation, include the processing operations according to the present disclosure.

A captured image accumulated by the image sensor 103 is input to the flicker detection section 112, and the flicker detection section 112 determines and detects the frequency and phase of flicker based on the periodicity of changes in luminance of images before and after the input image. The image capturing timing calculation section 109 determines a timing of executing image capturing according to the frequency and phase of flicker, which are detected by the flicker detection section 112, and notifies the camera controller 107 of the determined timing. The camera controller 107 executes image capturing based on the notified timing. The accumulation time calculation section 110 calculates an accumulation time period which is N-fold (N is a natural number) of the frequency of flicker detected by the flicker detection section 112, and notifies the camera controller 107 of the calculated accumulation time period. The camera controller 107 notifies the exposure controller 111 of the notified accumulation time period and executes image capturing. Note that the accumulation time period is a charge accumulation time period of the image sensor 103 and is also referred to as the accumulation time period of image capturing, the image capturing accumulation time period, or the like.

The light control calculation section 113 calculates an amount of main light emission necessary for image capturing based on a difference between an image captured with light emitted from the light emission section 115 and an image captured without light emitted from the light emission section 115. This amount of main light emission is notified from the camera controller 107 to the strobe controller 114, and the strobe controller 114 controls the amount of light emitted from the light emission section 115. Note that the image capturing timing calculation section 109, the accumulation time calculation section 110, the exposure controller 111, the flicker detection section 112, and the light control calculation section 113 can be included in the camera controller 107.

First, a relationship between flicker and a curtain speed, and the influence on an image capturing result will be described with reference to FIGS. 2A to 2F, and then a flow of a process of a flicker reduction method as the embodiment of the disclosure will be described with reference to FIG. 3. Note that the curtain speed refers to a time at which a mechanical shutter moves up and down. In the present embodiment, the curtain speed is set as a time period at which the shutter runs from the top portion to the bottom portion of the sensor (image sensor 103).

Figure 2A:
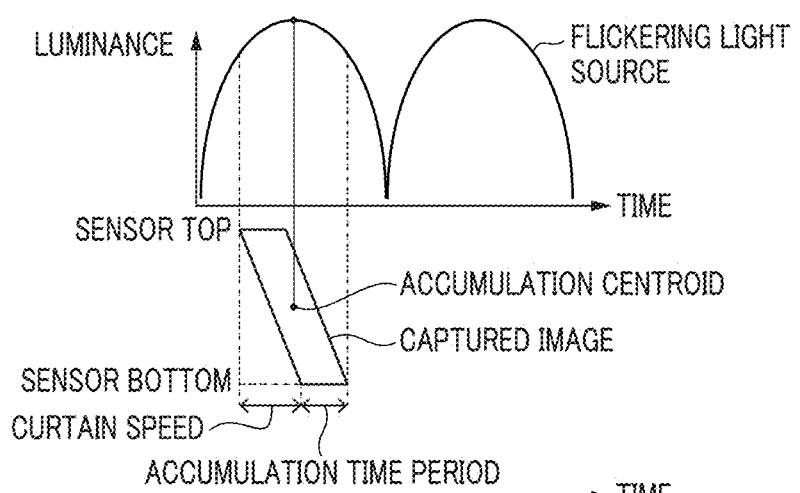
FIGS. 2A to 2F are diagrams useful in explaining a method of reducing flicker under a flickering light source and the influence of the flicker reduction method on an image.

FIG. 2A is a diagram useful in explaining control for detecting the frequency and phase of a flickering light source to perform image capturing at a timing at which an image is difficult to be affected by flicker. In this case, the curtain speed as the time period in which the shutter runs from the top portion to the bottom portion of the sensor (image sensor 103) is shorter than one period of flicker. Therefore, by performing image capturing such that the accumulation centroid of a captured image matches a timing at which the blinking light source (flicker) becomes brightest, the central part of the screen becomes brightest, and the luminance gradually lowers toward the top portion and bottom portion of the screen with reference to the central part. As a result, it is possible to capture an image on which the luminance unevenness within the screen is reduced as shown in FIG. 2D. Note that the accumulation centroid is the centroid of the captured image and corresponds to an intersection of diagonals of a parallelogram expressing the captured image in the illustrated example in FIGS. 2A to 2F.

Figure 2B:
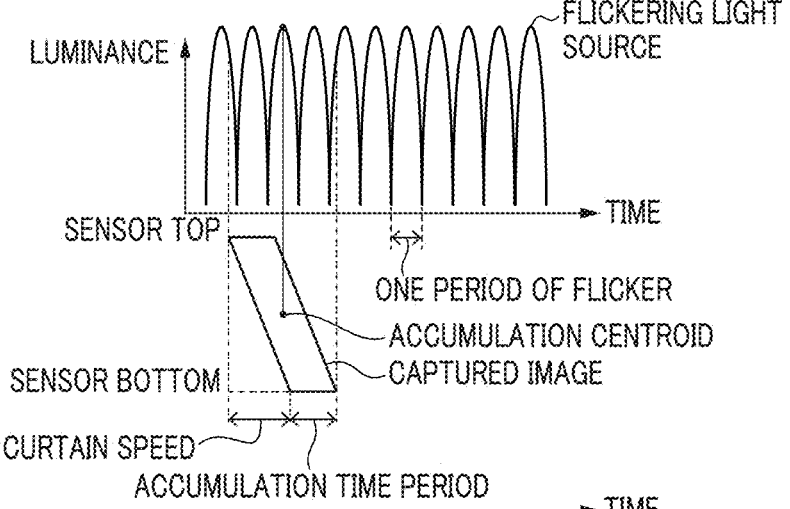

On the other hand, FIG. 2B is a diagram useful in explaining image capturing under a flickering light source which is higher in frequency than the light source in FIG. 2A. The curtain speed is longer than one period of flicker. Therefore, even when the accumulation centroid and the timing at which the blinking light source becomes brightest are caused to coincide with each other, an image is captured on which luminance unevenness and stripes are generated due to the influence of flicker, as shown in FIG. 2E.

Figure 2C:
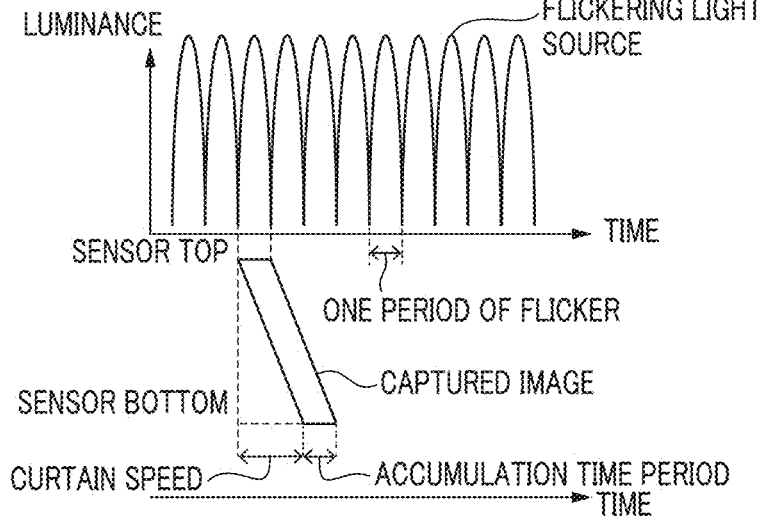
Figure 2D:
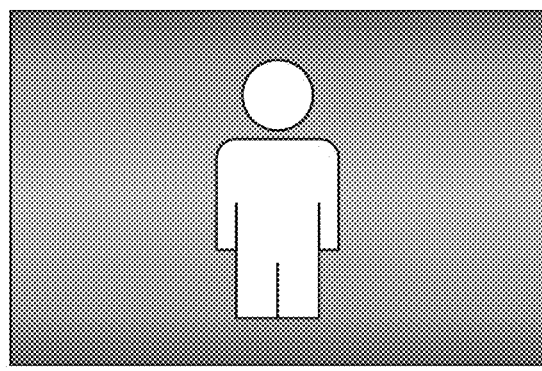
Figure 2E:
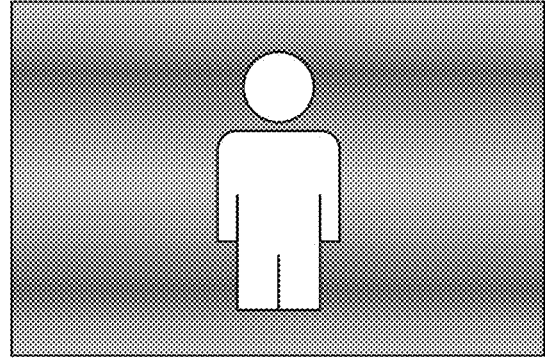
Figure 2F:
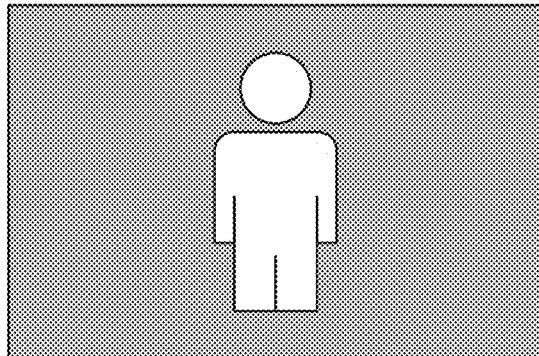

In such a case, as shown in FIG. 2C, image capturing is performed not by controlling the timing of image capturing such that the accumulation centroid and the timing at which the blinking light source becomes brightest are caused to coincide with each other, but by controlling the accumulation time period such that it is equal to (one period of flicker)×N times (N is a natural number). With this, it is possible to accumulate charges with the same exposure amount with respect to all pixels of the image sensor 103, and hence it is possible to reduce the influence of flicker. Further, in the illustrated example in FIG. 2C, image capturing is performed by setting the accumulation time period to (one period of flicker)×1 time, i.e. setting the accumulation time period to be the same as one period of flicker. As a result, as shown in FIG. 2F, it is possible to prevent luminance unevenness and stripes from being generated by the influence of flicker.

The flow of the above-described process will be described with reference to a flowchart in FIG. 3. Note that the process in FIG. 3 is controlled by the camera controller 107. First, when an image capturing instruction is provided, the process proceeds to a step S301, wherein presence/absence of flicker, and a frequency and a phase of flicker are detected by the flicker detection section 112. Next, if it is determined in a step S302 that flicker has not been detected (NO), the flicker reduction process is not needed, and hence the process proceeds to a step S307 to perform image capturing.

On the other hand, if flicker has been detected (YES), the process proceeds to a step S303. In the step S303, the flicker detection section 112 stores time of one period of the detected flicker with respect to a variable FLKCycle. Specifically, the time of one period of flicker is stored in a storage device, such as a random access memory (RAM), which is provided in the flicker detection section 112, in a state associated with the variable FLKCycle.

Next, in a step S304, the time of one period of flicker, which is associated with the variable FLKCycle, and the curtain speed of the shutter used for image capturing are compared. If the curtain speed is equal to or shorter than the time of one flicker period (YES), the process proceeds to a step S305. Then, in the step S305, the image capturing timing calculation section 109 performs control by calculation of the image capturing timing by taking the phase of the flicker into account, and then in the step S307, image capturing is executed according to an image capturing instruction received from the camera controller 107. Here, the calculation of the image capturing timing by taking the phase of the flicker into account is executed, for example, by performing control such that the phase of a start point of rise of a flicker waveform and the phase of a passing point at which the shutter passes the top of the image sensor 103 are caused to coincide with each other. In this example, specifically, the time of the start point of rise of the flicker waveform and the passing time at which the shutter passes the top of the image sensor 103 are caused to coincide with each other.

On the other hand, if it is determined in the step S304 that the curtain speed is longer (NO), the process proceeds to a step S306, and the accumulation time calculation section 110 calculates the accumulation time period used for image capturing. Here, the control is performed with a view to reducing the detected flicker. Therefore, assuming, for example, a light source that flickers at a frequency of 100 (Hz) is used, the time of one period of flicker is 10 (msec)), so that the accumulation time period corresponding to N-fold of one period of the detected frequency is calculated, e.g. as 10, 20, or 30 (msec), and then image capturing is performed in the step S307. Then, the image capturing is terminated.

As described above, it is possible to select the image capturing method effective for flicker reduction, according to the frequency of flicker and the curtain speed. For example, in a case where image capturing is performed under a light source that flickers at a frequency of 100 Hz and the curtain speed is 3 (msec), the condition of one period of flicker≥curtain speed is satisfied. Therefore, the user can capture an image, on which the flicker reduction effect is obtained, according to a desired accumulation time period without limiting the accumulation time period to 10×N (msec).

Inversely, in a case where a light source which flickers at a higher frequency of 1000 Hz is used with respect to the curtain speed 3 (msec), the condition of one period of flicker≥curtain speed is not satisfied. Therefore, assuming that the accumulation time period set by the user as desired is $1/800$ (sec), the flicker reduction effect cannot be obtained. The camera controller 107 determines the fact and makes it possible to obtain the flicker reduction effect by changing the desired accumulation time period $1/800$ (sec) to $1/1000$ (sec).

Note that when flicker is detected, whether to place priority on the flicker reduction effect (shift the image capturing timing or finely adjust the desired accumulation time period) or not can be selected by the user or can be determined by the image capturing apparatus 100. Further, although in the first embodiment, the description is given using the explanatory diagram assuming the slit rolling shutter, even in a case where a global shutter is used, it is possible to execute the control according to the process shown in FIG. 3.

Figure 3:
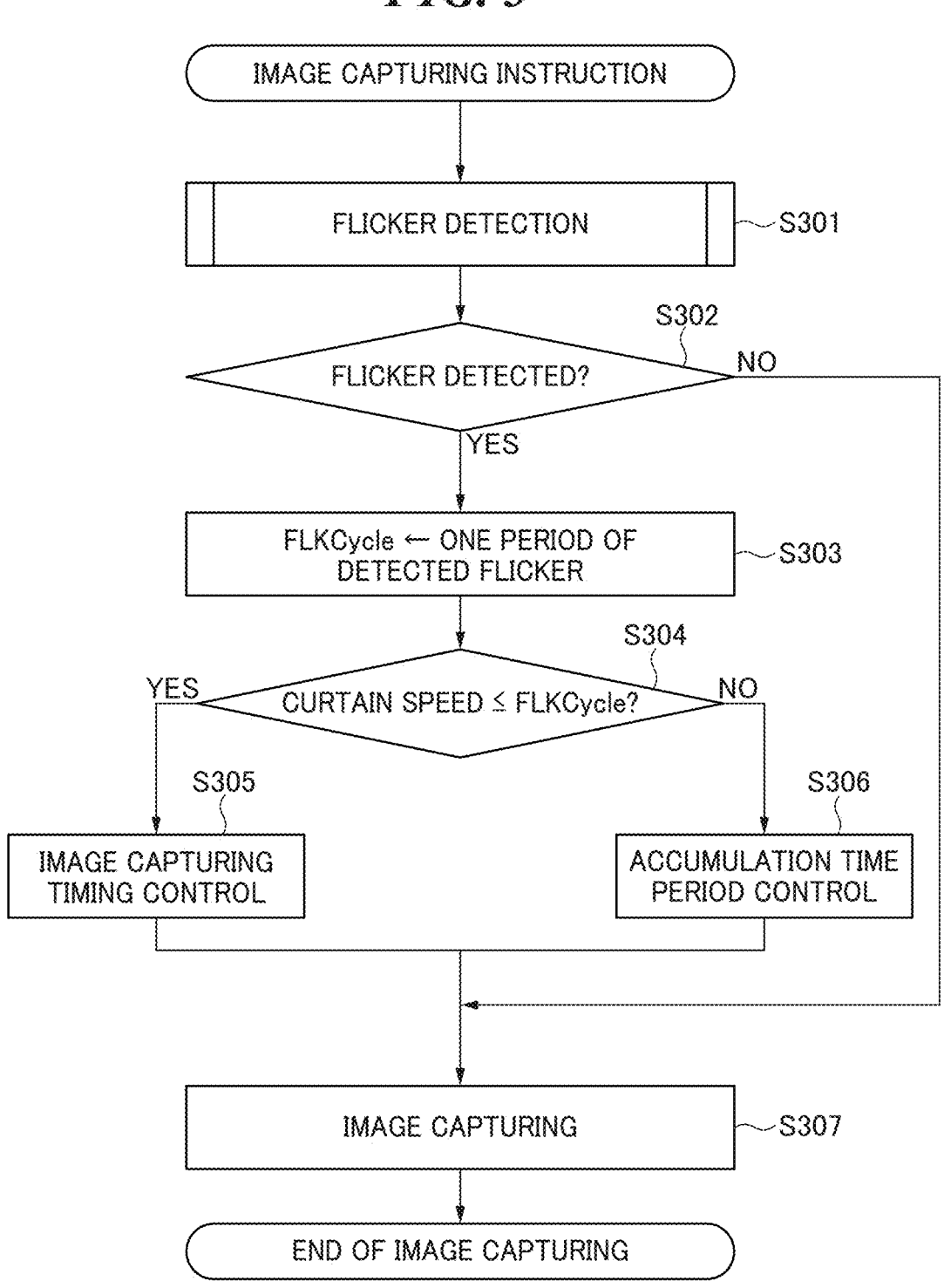
FIG. 3 is a flowchart of a flicker reduction image capturing process according to a first embodiment of the disclosure.

Note that in a case where the global shutter is used, it is possible to configure the processing flow such that only the image capturing timing control in the step S305 in FIG. 3 is performed. In the case where the global shutter is used, differently from the shutter which sequentially captures image information, an image is acquired simultaneously from all pixels, and hence the timing control is suitable.

Next, a second embodiment of the present invention will be described. The outline of normal strobe image capturing will be described below with reference to FIG. 4, and the condition of the accumulation time period used for light control calculation performed when strobe image capturing is performed will be described with reference to FIGS. 5A to 5D. Then, a method of reducing the influence of flicker on the light control calculation under a flickering light source, as the feature of the present embodiment, will be described with reference to FIGS. 6 to 8.

Figure 4:
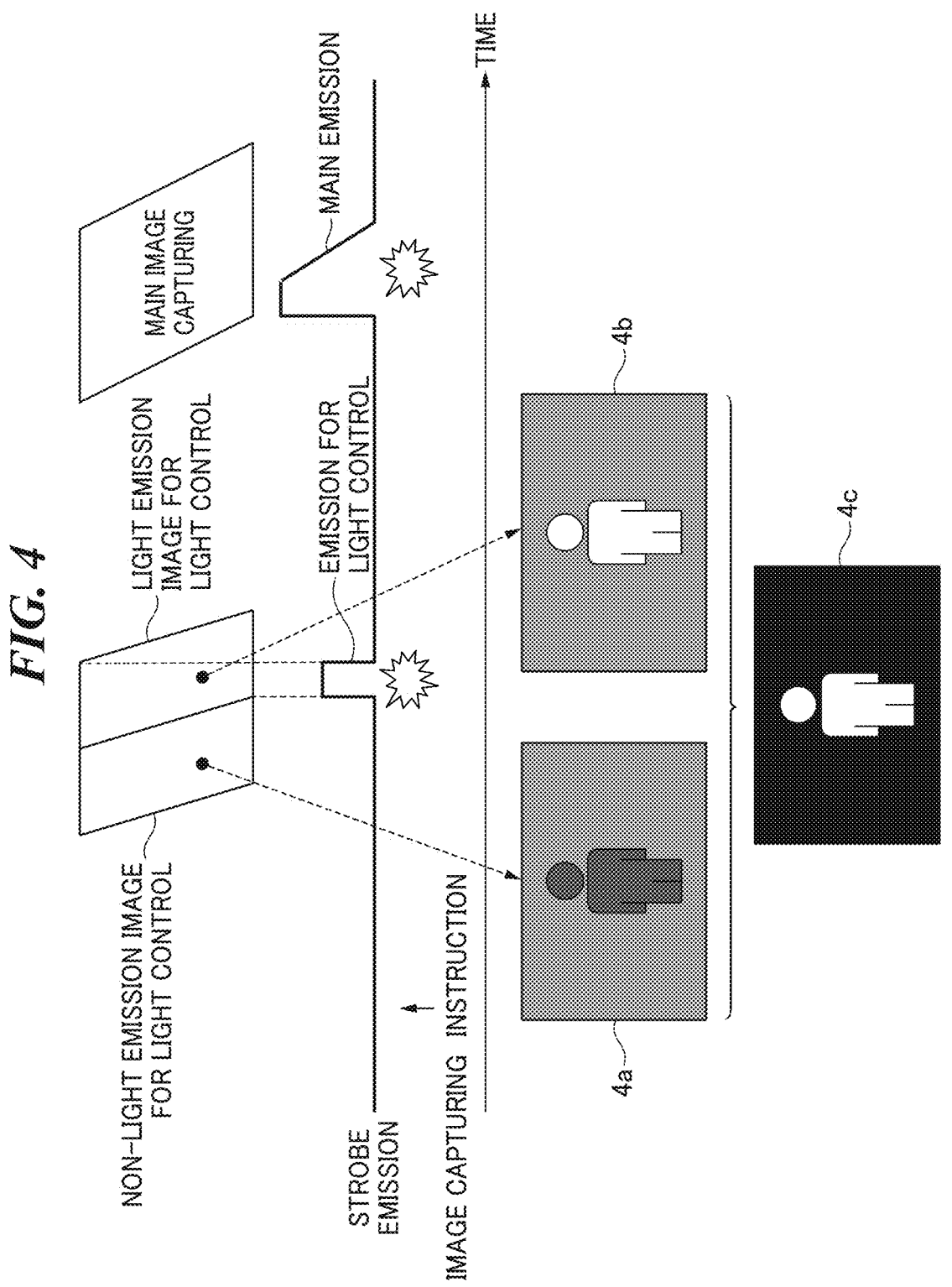
FIG. 4 is a schematic diagram useful in explaining a flow from light control calculation to image capturing in strobe image capturing.

FIG. 4 is a schematic diagram useful in explaining a flow from an image capturing instruction for performing strobe image capturing to main image capturing after light control calculation. Upon provision of an image capturing instruction to the image capturing apparatus 100 by the user via the operation section 108, the light control calculation section 113 performs light control calculation so as to calculate an amount of strobe main emission, which is to be used for main image capturing. In the light control calculation, the light control calculation section 113 determines a difference in luminance between an image captured without strobe light emission and an image captured with strobe light emission, and calculates an amount of light emission required to properly capture an image of an object.

For example, an image 4a is an image captured without strobe light emission, in which both of the object and the background are dark. On the other hand, in an image 4b captured with strobe light emission, the strobe light does not reach the background, and hence the background is not different in exposure from that of the image 4a, but the strobe light reaches the object, and hence an image is captured in which only on the object is high in exposure (image having the luminance improved). An image 4c is an image formed by calculating luminance differences between these two images, in which an area larger in difference appears whiter, and an area smaller in difference appears blacker. An area where a luminance difference is generated is determined as an object area desired to be made brighter by performing strobe image capturing (in other words, desired to increase the luminance), and the amount of main light emission for properly making the object brighter is calculated. This operation is the light control calculation.

Next, FIGS. 5A to 5D show four cases in which the accumulation time period for an image formed by light emission for light control (light emission image for light control) is varied. To uniformly irradiate the whole screen with strobe light, it is necessary to cause the strobe to emit light at a timing at which the accumulation time period for the top of the screen and the accumulation time period for the bottom of the same overlap each other (hereinafter referred to as "the shutter fully-opened section"). When the strobe light emission time necessary for the light control calculation is constant, it is necessary to secure at least this time as the accumulation time period for the light emission image for light control. For this reason, the accumulation time period during which strobe light emission time for light control corresponds to the shutter fully-opened section is the shortest accumulation time period for light control.

Figure 5A:
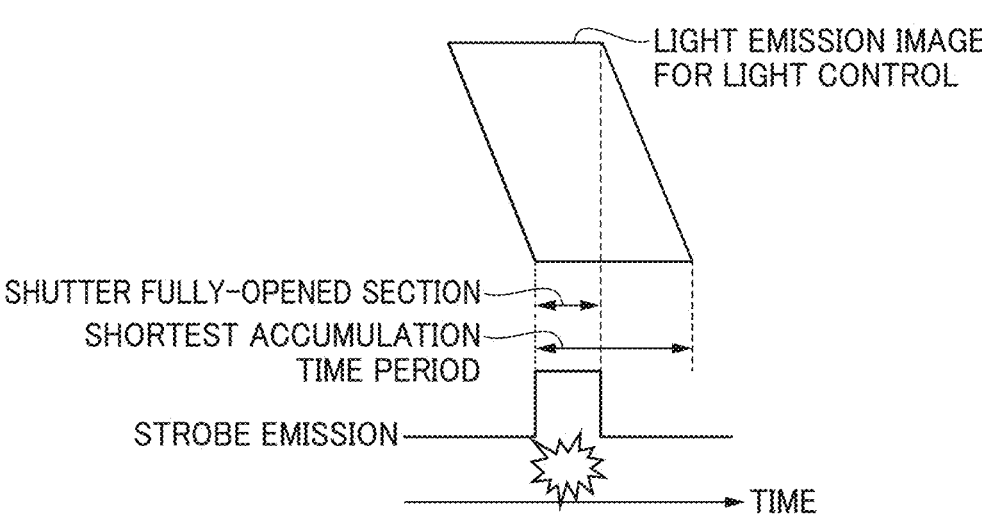
FIGS. 5A to 5D are schematic diagrams useful in explaining accumulation time restriction of an image for light control, which is used when the light control calculation is performed.
Figure 5B:
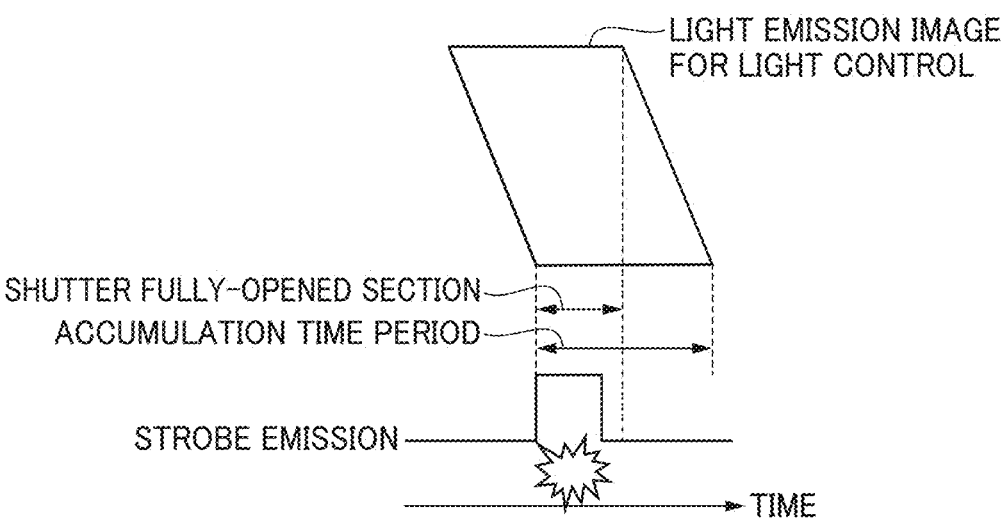
Figure 5C:
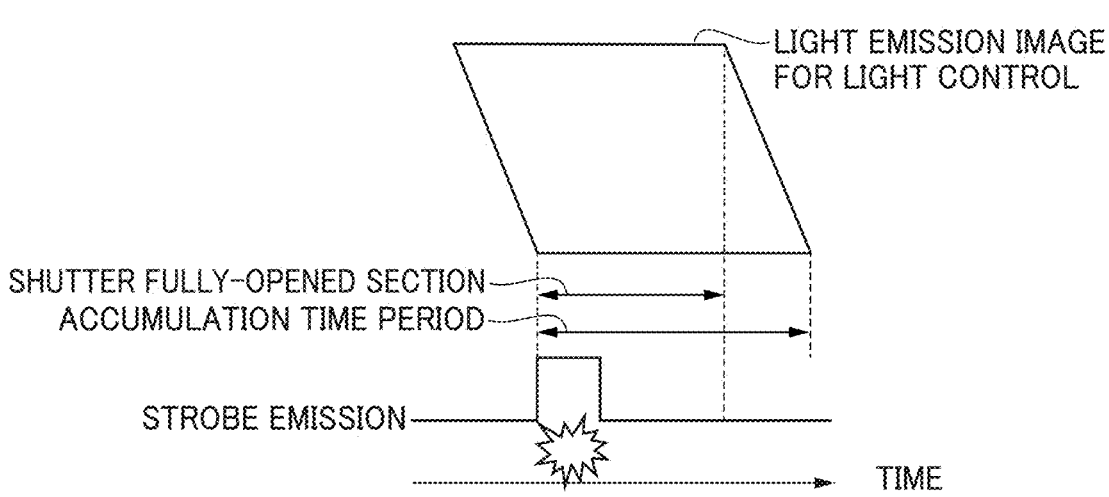

FIG. 5A is a diagram useful in explaining a relationship between strobe light emission and image capturing performed during the accumulation time period. Next, FIG. 5B shows a case where the accumulation time period becomes a little longer than in the case shown in FIG. 5A. Strobe light emission for light control is completed during the shutter fully-opened section and the condition of the light emission image for light control is satisfied. Further, FIG. 5C shows a case where the accumulation time period is further longer than in the case shown in FIG. 5B. The condition that the shutter fully-opened section is longer than the strobe light emission time is satisfied, but, in this case, if the accumulation time period is too long, the effect of the strobe light emission is reduced due to the influence of outside light (environmental light), which can prevent the light control calculation from being accurately performed.

Figure 5D:
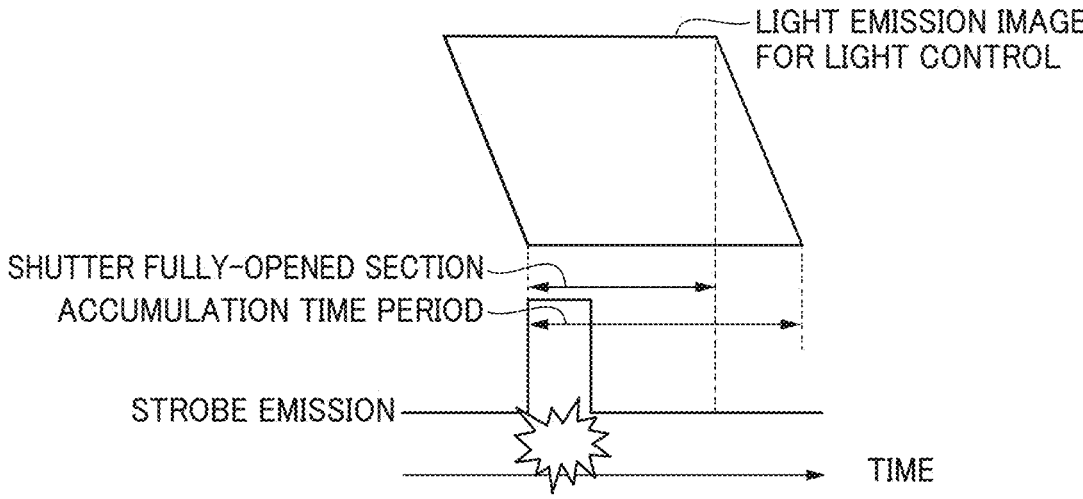

In this case, it is necessary to perform image capturing by increasing the amount of strobe emission as shown in FIG. 5D, but the strobe emission amount itself sometimes has a limit, and even when the strobe emission amount does not reach the limit, there is caused a new problem that the increase of the light emission amount increases the power consumption and the like. Therefore, in the accumulation time period for the light emission image for light control, the upper limit of the accumulation time period is specified based on a light emission amount which (1) makes it possible to accurately perform light control calculation and (2) is allowable as the power consumption, and this is the longest accumulation time period for light control.

Figure 6A:
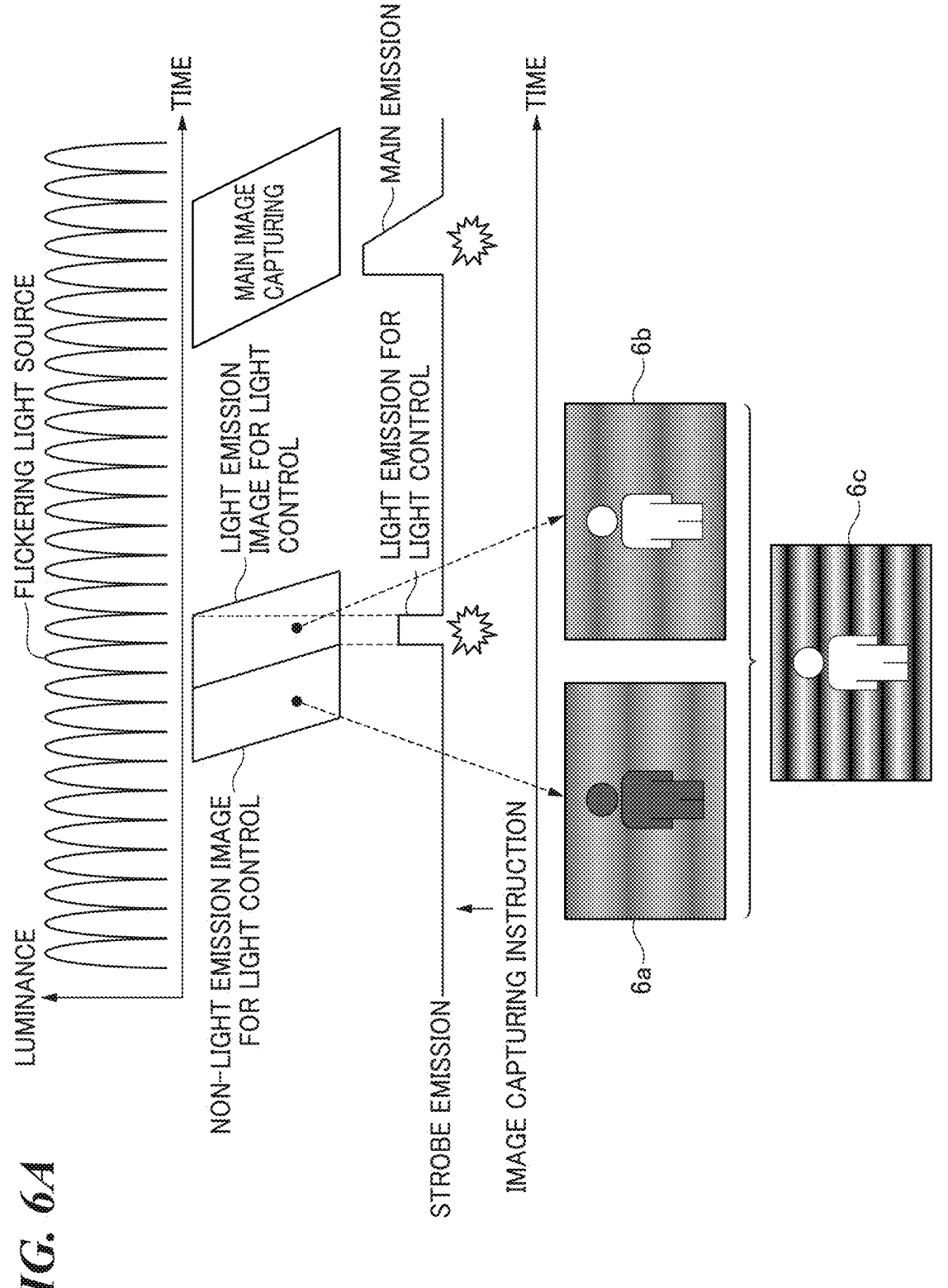
FIG. 6A is a diagram useful in explaining a light control problem under a flickering light source and a flicker reduction method.

The light control under a flickering light source, as the feature of the present embodiment, will be described with reference to FIGS. 6A, 6B, 7A, and 7B, based on the description given with reference to FIGS. 4, and 5A to 5D. FIG. 6A is a diagram useful in explaining the influence of strobe image capturing under a flickering light source on an image used for light control calculation.

Upon provision of a strobe image capturing instruction, a non-light emission image 6a for light control and a light emission image 6b for light control are sequentially acquired and accumulated before main image capturing, whereby an object area is identified from luminance differences between the two images, and then the amount of main light emission is calculated. Here, when attention is paid to the two images, as shown by the non-light emission image 6a and the light emission image 6b, stripes as exposure unevenness are generated by being affected by blinking of the flickering light source. Further, each image has been captured in a different phase of the blinking period of the light source, and hence the positions of the stripes generated within the screen are also different. An image formed by calculating luminance differences between the two images is an image 6c, in which a luminance difference area having stripes is generated in other than the object area. Note that, similar to FIG. 4, an area having a larger difference appears whiter, and an area having a smaller difference appears blacker. If the amount of main light emission which can obtain proper exposure is determined with respect to an area where a luminance difference is generated, a luminance difference in the stripe is also increased in these background areas so that the background area becomes a calculation target, which makes it impossible to perform calculation of the proper amount of main light emission for the object.

Figure 6B:
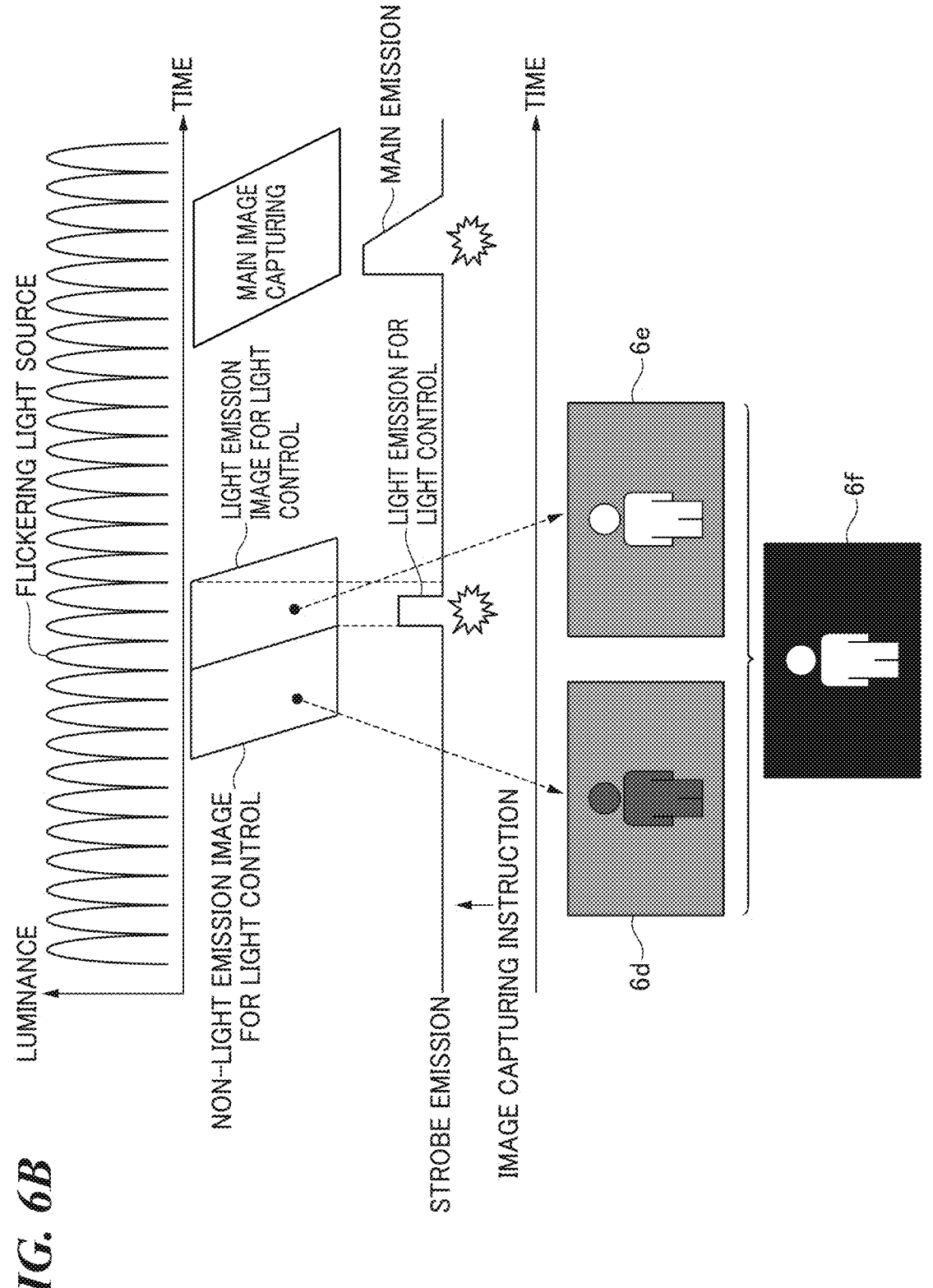
FIG. 6B is a diagram useful in explaining a light control problem under a flickering light source and a flicker reduction method.

To overcome this problem, in FIG. 6B, a non-light emission image 6d for light control and a light emission image 6e for light control are captured by setting the accumulation time periods to (one period of flicker)×N (N is a natural number). This prevents the non-light emission image 6d for light control and the light emission image 6e for light control from being affected by flicker, and hence it is possible to obtain the images on which stripes as exposure unevenness are not generated. An image 6f formed by calculating luminance differences enables extraction of only the object area as the light control calculation target, which makes it possible to perform the proper light control calculation. Therefore, according to the strobe image capturing instruction, the camera controller 107 can sequentially acquire the non-light emission image 6d for light control and the light emission image 6e for light control before main image capturing, identify the object area based on luminance differences between the images 6d and 6e, and calculate the amount of main light emission. As a result, upon provision of the instruction from the camera controller 107 to the strobe controller 114, the strobe controller 114 controls the light emission section 115 to irradiate the object with the amount of main light emission, thereby making it possible to perform the main image capturing.

Figure 7A:
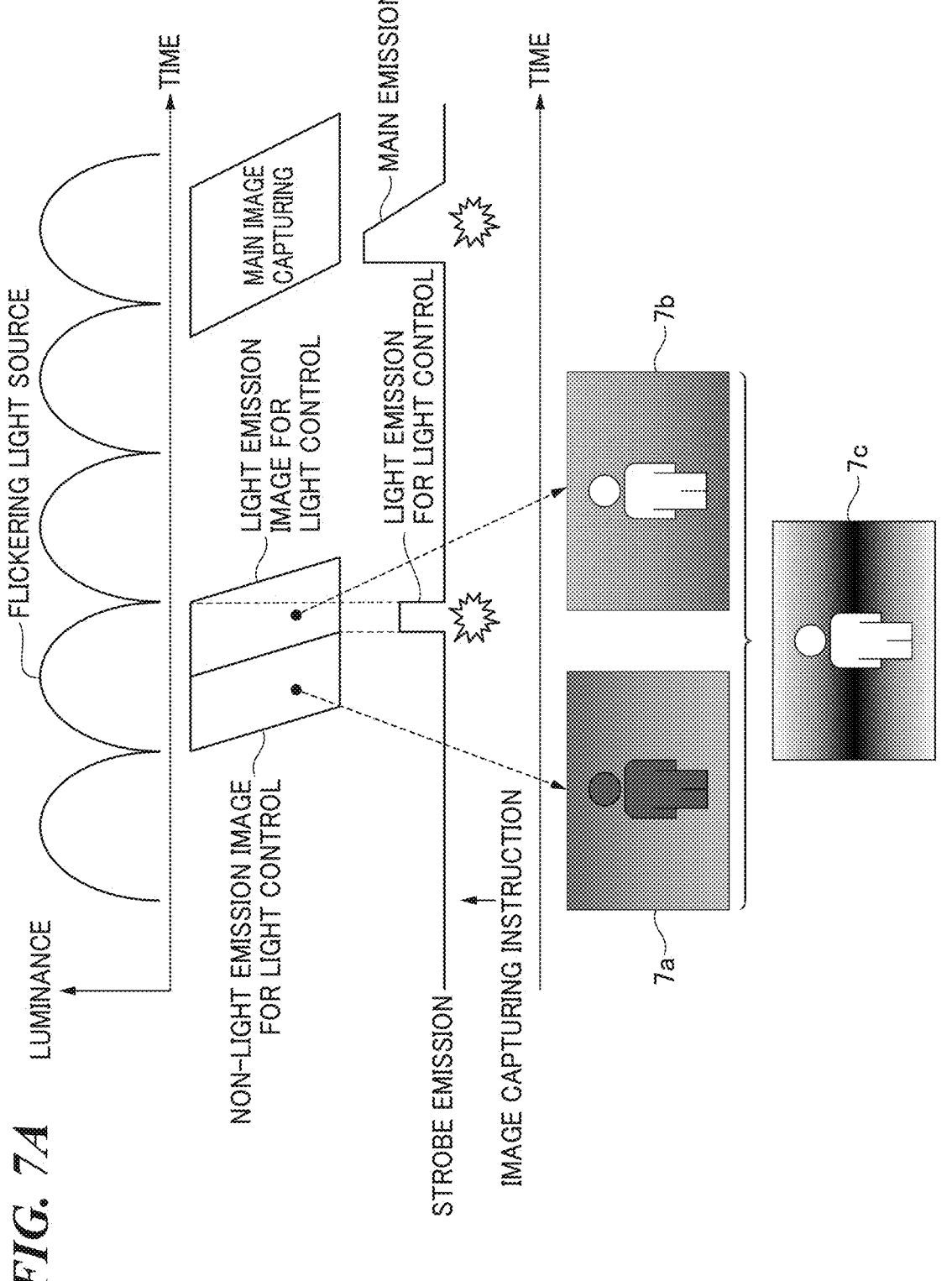
FIG. 7A is a diagram useful in explaining a light control problem under a flickering light source and a flicker reduction method.
Figure 7B:
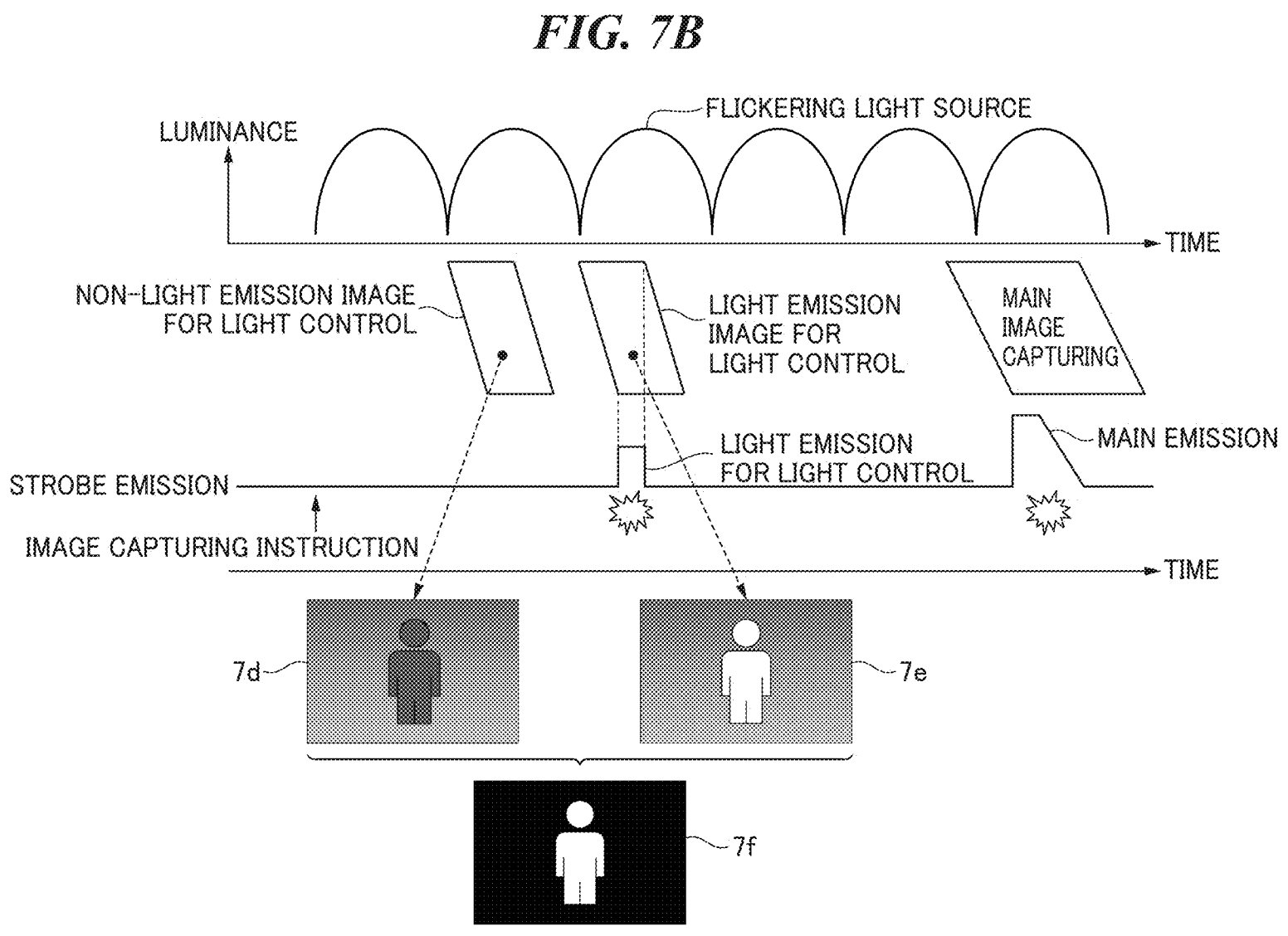

However, depending on the frequency of flicker, the accumulation time period shown in FIG. 6B cannot be necessarily set. FIGS. 7A and 7B show an example of strobe image capturing under a flickering light source, which is lower in frequency than in FIGS. 6A and 6B. The frequency of the flickering light source, illustrated in each upper part of FIGS. 7A and 7B, is lower than the frequency of the flickering light source, illustrated in each upper part of FIGS. 6A and 6B.

The principle of generation of exposure unevenness in a non-light emission image 7a for light control and a light emission image 7b for light control is the same as the description given with reference to FIG. 6A, and hence redundant description is omitted. The non-light emission image 7a for light control is dark in an upper portion of the screen, and the light emission image 7b for light control is dark in a lower portion of the screen, and hence in a luminance difference image 7c, large luminance differences are generated not only in the object area, but also in the upper portion and the lower portion of the background area.

On the other hand, when the same measure as described with reference to FIG. 6B is taken, assuming that a flickering light source that flickers at a frequency of 100 (Hz) is used, the accumulation time period of at least 10 (msec) is required. However, in a case where the above-mentioned longest accumulation time period for light control is limited to 6 (msec), the accumulation time period of 10 (msec) cannot be set, which makes it impossible to acquire an image on which the influence of flicker is reduced. In this case, as shown in FIG. 7B, the timing control is performed, without changing the accumulation time period set to the desired value satisfying the light control condition, such that the start of accumulation for a non-light emission image 7d for light control and the start of accumulation for a light emission image 7e for light control become the same phase as the blinking period of the light source.

For example, assuming that images are captured under the flickering light source that flickers at a frequency of 100 (Hz), accumulation of the light emission image 7e for light control is started when 10×N (msec) (N is a natural number) elapses after accumulation of the non-light emission image 7d for light control has been started. By doing this, although the exposure unevenness in the background area continues to be generated without any significant change, since the start of accumulation and the phase of the light source are made coincident with each other, this exposure unevenness is generated in the same position to the same degree and can be offset by calculating the luminance difference. As a result, it is possible to extract only the object area as the light control calculation target as indicated by an image 6f and perform proper light control.

Figure 8:
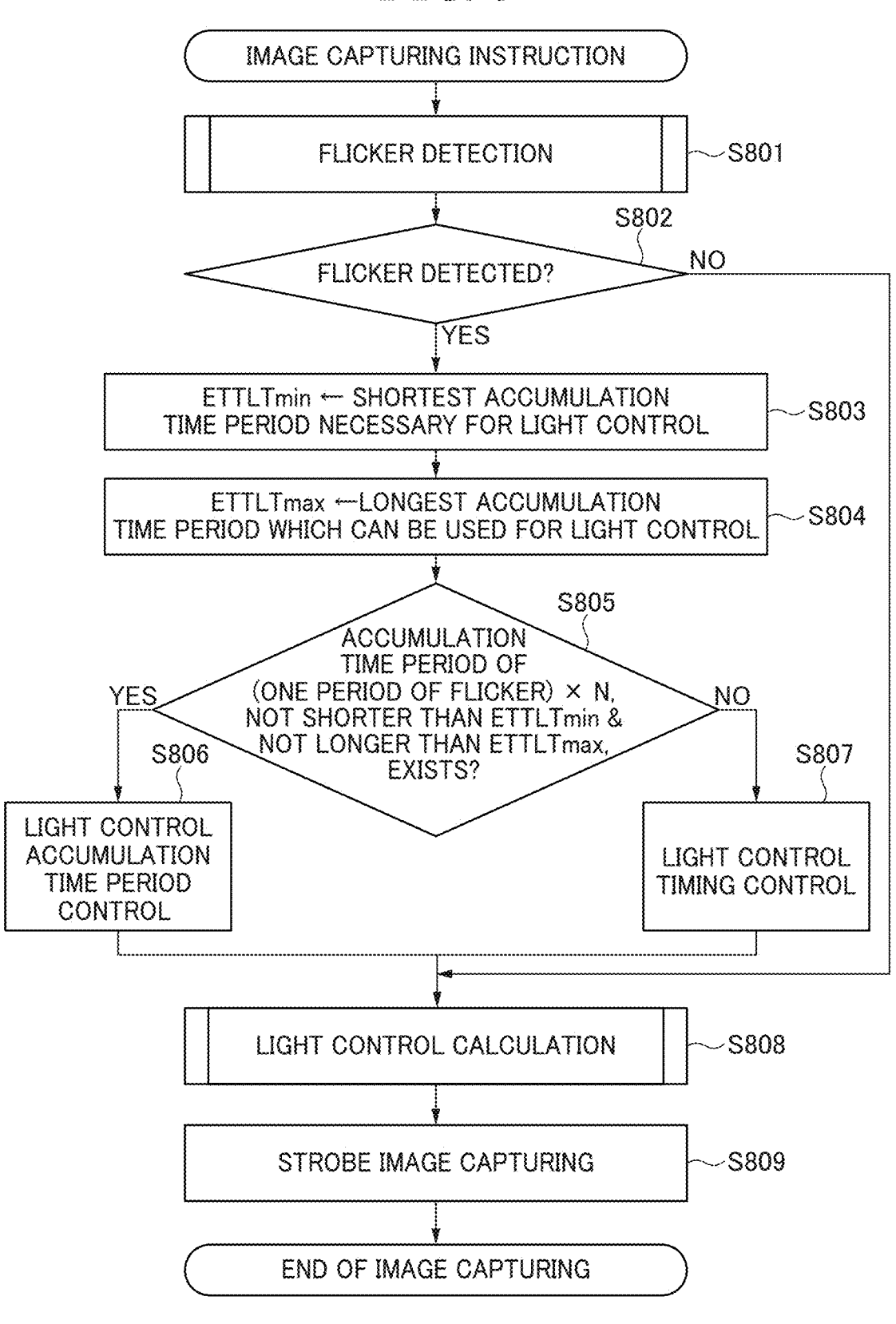
FIG. 8 is a flowchart of a flicker reduction image capturing process executed when the light control is performed.

The flow of the process for selecting the above-described methods will be described with reference FIG. 8. Note that the process in FIG. 8 is advanced and controlled by the camera controller 107. First, when an image capturing instruction is provided via the operation section 108, the process proceeds to a step S801, and the flicker detection section 112 detects presence/absence of flicker and a frequency of the flicker.

Next, if it is determined in a step S802 that flicker has not been detected (NO), the process proceeds to a step S808, wherein the light control calculation is performed. On the other hand, if it is determined in the step S802 that flicker has been detected (YES), the process proceeds to a step S803.

In the step S803, the shortest accumulation time period necessary for the light control calculation is stored as a variable ETTLTmin. Then, in a step S804, the longest accumulation time period which can be used for the light control calculation is acquired and stored as a variable ETTLTmax. For example, both of the shortest accumulation time period stored in the step S803 and the longest accumulation time period stored in the step S804 are calculated by the accumulation time calculation section 110 and notified to the camera controller 107. Further, both of the shortest accumulation time period and the longest accumulation time period are sometimes determined in advance for each type of the image capturing apparatus 100. Further, there is an image capturing apparatus 100 that can cope with the shortest accumulation time period and the longest accumulation time period, by using a value determined for one of them in advance for each model of the image capturing apparatus 100, and by calculating the other by the accumulation time calculation section 110. In this case, the other of the accumulation time periods, which is calculated by the accumulation time calculation section 110, is notified to the camera controller 107. Thus, the shortest accumulation time period and the longest accumulation time period are obtained and stored as the variable ETTLTmin and the variable ETTLTmax, respectively. Note that the variable ETTLTmin and the variable ETTLTmax are stored e.g. in a RAM in the camera controller 107. Further, in a case where the shortest accumulation time period and the longest accumulation time period have been determined in advance, the following process is executed: For example, a central processing unit (CPU) of the camera controller 107 reads the shortest accumulation time period and/or the longest accumulation time period, determined in advance, from a read only memory (ROM) and stores the read shortest accumulation time period and/or the longest accumulation time period in the RAM in a state associated with the corresponding variable ETTLTmin and/or the variable ETTLTmax.

Next, a step S805 is processing for selecting the method of reducing the influence of flicker. If there exists N (N is a natural number) which satisfies a condition that the effect of flicker reduction can be obtained by the accumulation time period of (one period of flicker)×N, and a condition that the accumulation time period is not shorter than ETTLTmin and is not longer than ETTLTmax is satisfied (YES), the process proceeds to a step S806. Then, in the step S806, this accumulation time period is employed as the accumulation time period for the images for light control. This is the method described with reference to FIG. 6B.

On the other hand, if N satisfying the conditions does not exist (NO), the process proceeds to a step S807. In the step S807, the camera controller 107 controls the accumulation timing for the images for light control. This is the method described with reference to FIG. 7B. The timing control referred to here is to make the interval between the starts of accumulation of two images equal to time of (one period of flicker)×N (N is a natural number). After completion of the step S806 or S807, the process proceeds to the step S808. In the step S808, the light control calculation section 113 performs the light control calculation and calculates the amount of main light emission. Then, in a step S809, the strobe controller 114 controls the light emission section 115 to emit light with the amount of main light emission, calculated in the step S808, for strobe image capturing, and then the image capturing is terminated.

As described above, even under the flickering light source, it is possible to perform proper light control calculation with respect to an object of which an image is to be captured without being affected by flicker. It is possible to reduce the influence of flicker by using any one of the methods described with reference to FIG. 6B and FIG. 7B. However, in a case where it is possible to control a necessary accumulation time period, it is preferable to place priority on the accumulation time period control method. This is because the accumulation time period control makes it possible to temporally continuously capture a non-light emission image for light control and a light emission image for light control and hence the accumulation time period control is advantageous also for image capturing of a moving object.

Further, an instruction section, such as a dedicated button, can be provided so as to enable a user to select which one of the methods in FIG. 6B and FIG. 7B is to be used, or can enable a user to select the method by operating the existing operation section 108 or by performing a special operation on the operation section 108. Examples of the special operation include an operation of simultaneously pressing a plurality of operation elements arranged in advance.

Further, in the image capturing timing control method, FIG. 7B shows the example in which accumulation of the image for light control is started at a timing at which flicker blinking is darkest. That is, as shown in FIG. 7B, the lowest point of the brightness (see the vertical axis) of the flickering light source is set as the start point. However, the interval between the starts of accumulation of images is only required to be set to N-fold of the time of one period of flicker, and hence the accumulation can be started at a desired timing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-172215 filed Oct. 3, 2023, which is hereby incorporated by reference herein in its entirety.

What is claimed is:

1. An image capturing apparatus including an image sensor for capturing an object image formed through an optical system, comprising:
   at least one processor; and
   a memory coupled to the at least one processor storing instructions that, when executed by the processor, cause the processor to function as:
   a flicker detection section configured to detect a frequency and a phase of flicker;
   a comparison section configured to compare a curtain speed as a time period over which a shutter runs from a top to a bottom of the image sensor and a flicker period time as a time of one period of flicker; and an image capturing controller configured to capture, in a case where the curtain speed is longer than the flicker period time, an image of an object by performing control of an image capturing accumulation time period, whereas capture, in a case where the curtain speed is shorter than or equal to the flicker period time, an image of the object by performing control of image capturing timing based on the detected frequency and phase of the flicker.

2. The image capturing apparatus according to claim 1, wherein the control of the image capturing accumulation time period is performed such that the image capturing accumulation time period is made equal to (one period of flicker)×N (N is a natural number).

3. The image capturing apparatus according to claim 1, wherein the control of the image capturing timing is performed such that a phase of a start point of rise of a flicker waveform and a phase of a passing point at which the shutter passes the top of the image sensor are caused to coincide with each other.

4. An image capturing apparatus that sequentially acquires, according to a strobe image capturing instruction, a non-light emission image for light control and a light emission image for light control, before main image capturing, identifies an object area based on luminance differences between the acquired images, and calculates an amount of main light emission, to thereby enable main image capturing of an object, comprising:
   at least one processor; and
   a memory coupled to the at least one processor storing instructions that, when executed by the processor, cause the processor to function as:
   a flicker detection section configured to detect a frequency and a phase of flicker; and
   an image capturing controller configured to enable, in a case where a time period satisfying a predetermined condition exists, main image capturing, by performing control of a light control accumulation time period for setting the time period to an accumulation time period for light control, whereas, in the other cases, enable main image capturing, by performing control of light control timing, based on a frequency and a phase of the flicker.

5. The image capturing apparatus according to claim 4, wherein the time period satisfying the predetermined condition is a time period which is not shorter than the shortest accumulation time period necessary for light control and not longer than the longest accumulation time period which can be used for light control, and satisfies (one period of flicker)×N (N is a natural number).

6. The image capturing apparatus according to claim 4, wherein the control of the light control timing performs control such that an interval between starts of accumulation of the acquired images is equal to a time period of (one period of flicker)×N (N is a natural number).

7. The image capturing apparatus according to claim 4, wherein the control of the light control timing is performed such that a phase of the start time of accumulation of each of the acquired images coincides with a phase of a blinking period of a light source of the flickering.

8. The image capturing apparatus according to claim 7, wherein the control of the light control timing is performed such that accumulation for the light emission image for light control is started when (one period of flicker)×N (N is a natural number) elapses after the start of accumulation for the non-light emission image for light control.

9. A method of controlling an image capturing apparatus including an image sensor for capturing an object image formed through an optical system, comprising:

detecting a frequency and a phase of flicker;

comparing a curtain speed as a time period over which a shutter runs from a top to a bottom of the image sensor and a flicker period time as a time of one period of flicker; and capturing, in a case where the curtain speed is longer than the flicker period time, an image of an object by performing control of an image capturing accumulation time period, whereas capturing, in a case where the curtain speed is shorter than or equal to the flicker period time, an image of the object by performing control of image capturing timing based on the detected frequency and phase of the flicker.

10. A method of controlling an image capturing apparatus that sequentially acquires, according to a strobe image capturing instruction, a non-light emission image for light control and a light emission image for light control, before main image capturing, identifies an object area based on luminance differences between the acquired images, and calculates an amount of main light emission, to thereby enable main image capturing of an object, comprising:

detecting a frequency and a phase of flicker; and enabling, in a case where a time period satisfying a predetermined condition exists, main image capturing, by performing control of a light control accumulation time period for setting the time period to an accumulation time period for light control, whereas, in the other cases, enabling main image capturing, by performing control of light control timing, based on a frequency and a phase of the flicker.

11. A non-transitory computer-readable storage medium storing a program for causing a computer to execute a method of controlling an image capturing apparatus including an image sensor for capturing an object image formed through an optical system, wherein the method comprises:

detecting a frequency and a phase of flicker;

comparing a curtain speed as a time period over which a shutter runs from a top to a bottom of the image sensor and a flicker period time as a time of one period of flicker; and capturing, in a case where the curtain speed is longer than the flicker period time, an image of an object by performing control of an image capturing accumulation time period, whereas capturing, in a case where the curtain speed is shorter than or equal to the flicker period time, an image of the object by performing control of image capturing timing based on the detected frequency and phase of the flicker.

12. A non-transitory computer-readable storage medium storing a program for causing a computer to execute a method of controlling an image capturing apparatus that sequentially acquires, according to a strobe image capturing instruction, a non-light emission image for light control and a light emission image for light control, before main image capturing, identifies an object area based on luminance differences between the acquired images, and calculates an amount of main light emission, to thereby enable main image capturing of an object, wherein the method comprises:

detecting a frequency and a phase of flicker; and enabling, in a case where a time period satisfying a predetermined condition exists, main image capturing, by performing control of a light control accumulation time period for setting the time period to an accumulation time period for light control, whereas, in the other cases, enabling main image capturing, by performing control of light control timing, based on a frequency and a phase of the flicker.

\* \* \* \* \*